G. W. JACKSON.
LOADING MACHINE.
APPLICATION FILED OCT. 8, 1917.
1,313,218.
Patented Aug. 12, 1919.
5 SHEETS—SHEET 2.
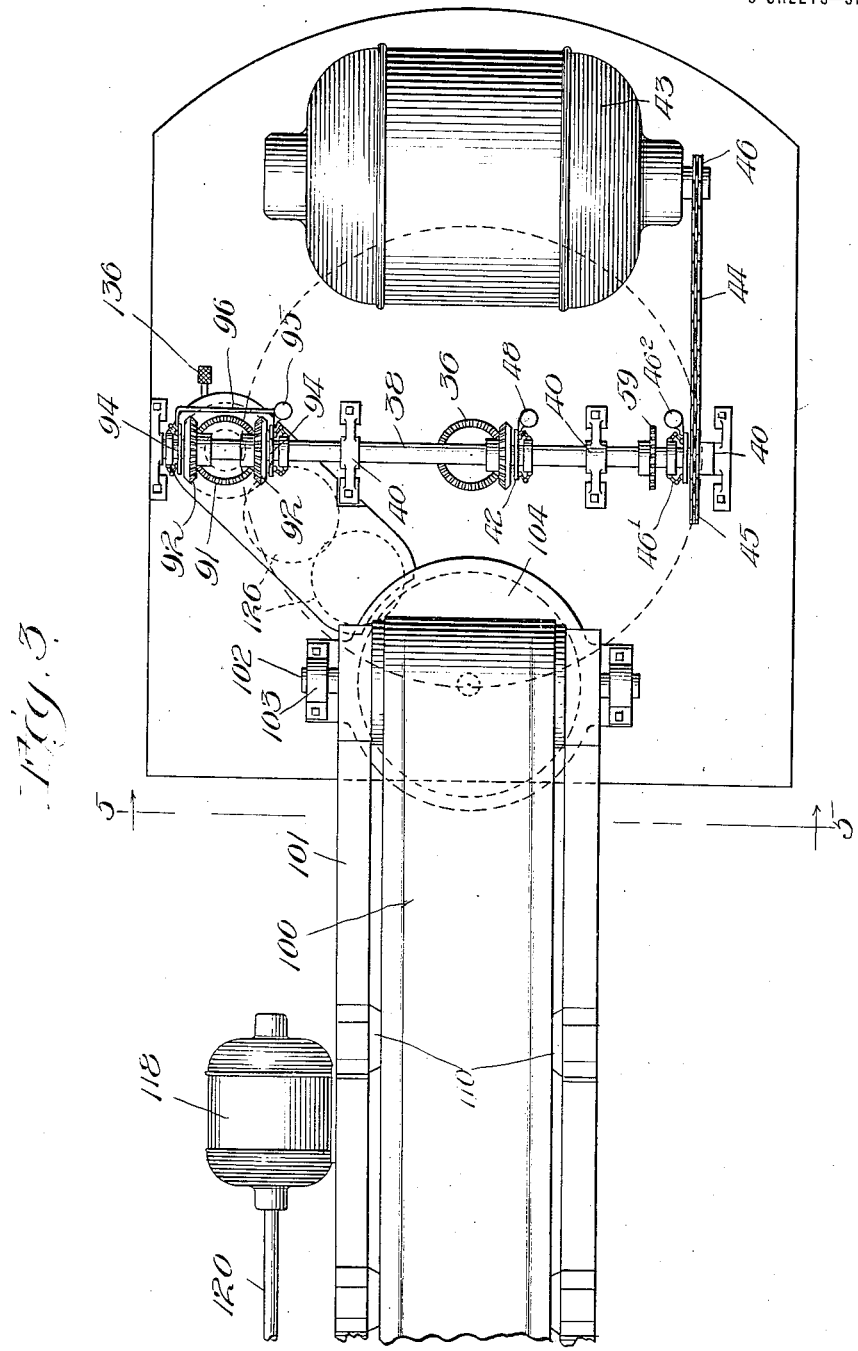

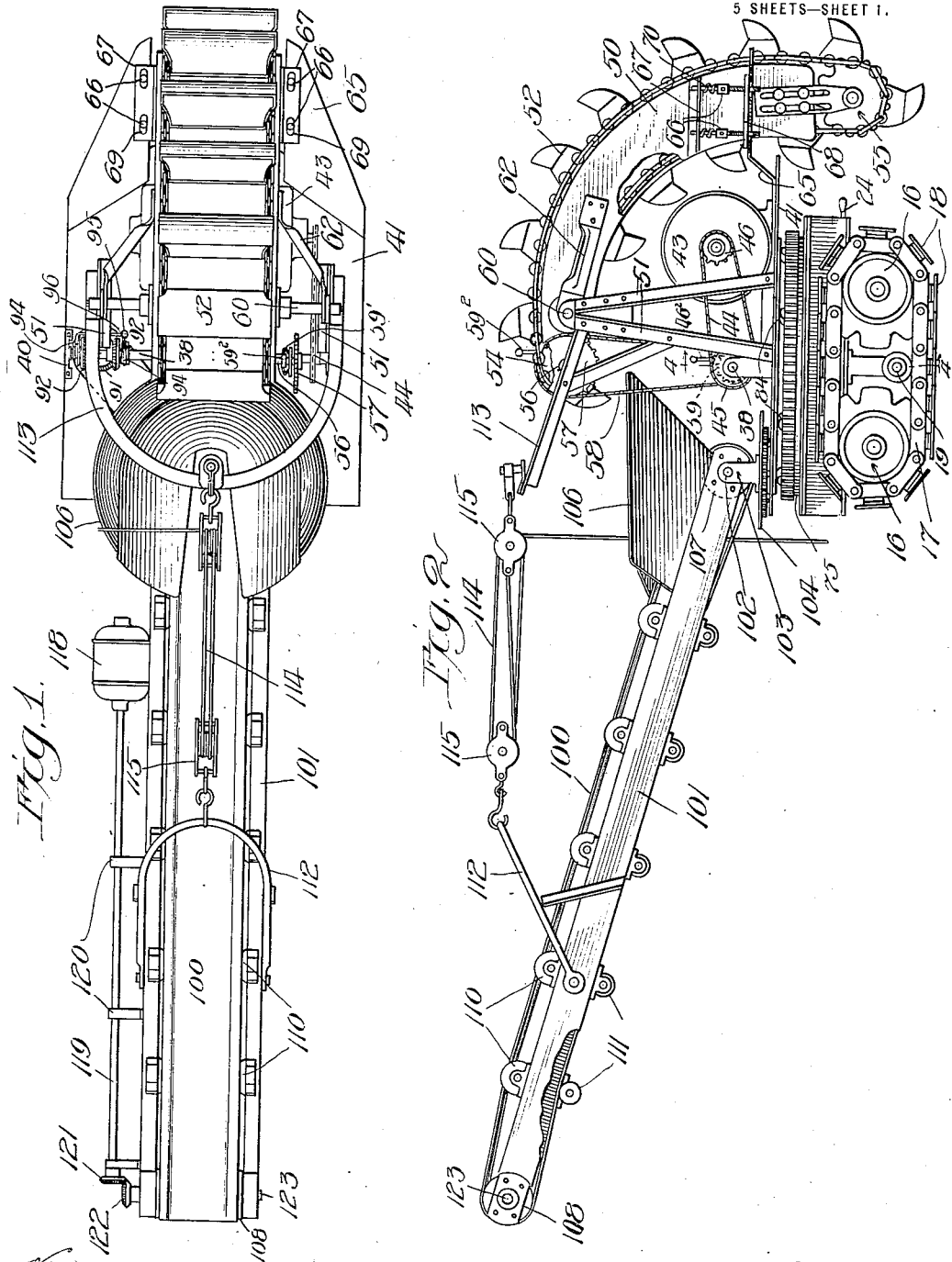

G. W. JACKSON.
LOADING MACHINE.
APPLICATION FILED OCT. 8, 1917.

1,313,218.

Patented Aug. 12, 1919.
5 SHEETS—SHEET 3.

Witness:
Harry S. Gaither

Inventor:
George W. Jackson
by William L. Hale
Atty

G. W. JACKSON.
LOADING MACHINE.
APPLICATION FILED OCT. 8, 1917.

1,313,218.

Patented Aug. 12, 1919.
5 SHEETS—SHEET 4.

Witness:
Harry S. Gaither

Inventor:
George W. Jackson
by William L. Hale.
Atty

G. W. JACKSON.
LOADING MACHINE.
APPLICATION FILED OCT. 8, 1917.

1,313,218.

Patented Aug. 12, 1919.
5 SHEETS—SHEET 5.

Witness:
Harry S. Gaither

Inventor
George W. Jackson
by William L. Hale
Atty

UNITED STATES PATENT OFFICE.

GEORGE W. JACKSON, OF CHICAGO, ILLINOIS, ASSIGNOR, BY MESNE ASSIGNMENTS, TO AMERICAN POWER SHOVEL COMPANY, OF MILWAUKEE, WISCONSIN, A CORPORATION OF WISCONSIN.

LOADING-MACHINE.

1,313,218.

Specification of Letters Patent.  Patented Aug. 12, 1919.

Application filed October 8, 1917. Serial No. 195,213.

*To all whom it may concern:*

Be it known that I, GEORGE W. JACKSON, a citizen of the United States, and a resident of Chicago, in the county of Cook and State of Illinois, have invented certain new and useful Improvements in Loading-Machines; and I do hereby declare that the following is a full, clear, and exact description thereof, reference being had to the accompanying drawings, and to the characters of reference marked thereon, which form a part of this specification.

This invention relates to improvements in machines for loading or unloading loose material, such as broken stone produced in the construction of tunnels, coal, ores, and other granular materials.

Among the objects of the invention is to improve loading machines of that type which embraces a movable carriage or truck which carries a boom on which is mounted to travel a continuous series of pick-up devices, such as buckets, with means whereby the boom support may be rotated on the carriage to present the receiving end of the boom through wide horizontal angles to the material, and a take-off device for carrying the material picked up by the pick-up devices to a point in rear of the machine.

A further object of the invention is to provide a novel mounting for a turn table, through the medium of which the boom is supported on the carriage, so constructed as to permit slippage of the turn table relatively to the mechanism which rotates the same, so as to thereby relieve the parts of strains occasioned by turning the boom against an obstruction.

Another object of the invention is to provide a connection between the turn table driving mechanism and the pivot of the take-off belt frame that is supported on the turn table eccentrically to the turning axis of the turn table, so as to thereby maintain the discharge end of the take-off device in its proper discharging position.

Another object of the invention is to simplify loading machines, and the invention consists in the combination and arrangement of the parts shown in the drawings and described in the specification and is pointed out in the appended claims.

In the drawings:—

Figure 1 is a plan view of a loading machine embodying my invention.

Fig. 2 is a side elevation, with parts broken away.

Fig. 3 is a plan view of the carriage and a portion of the take-off device, showing the driving and controlling means for the several elements of the machine.

Figure 5:
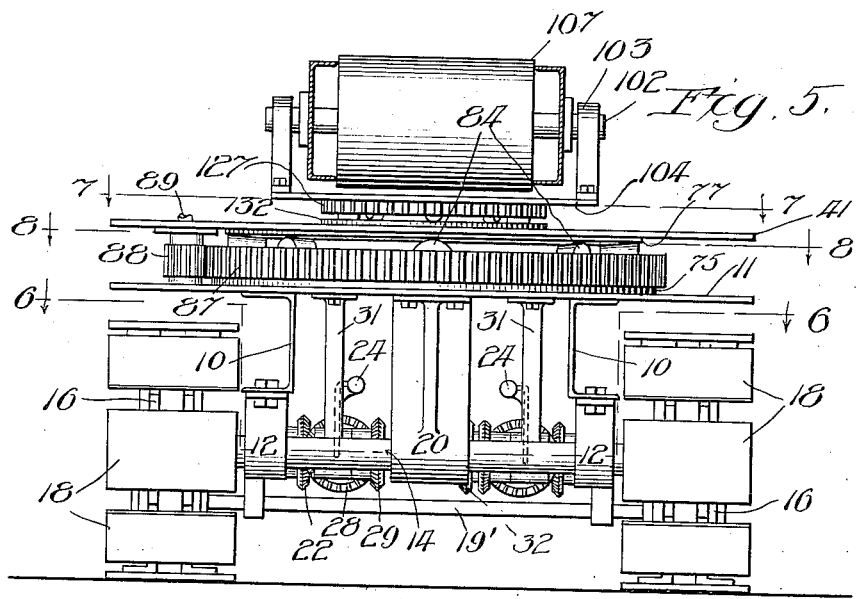
Fig. 5 is a front view of the carriage and turn table and also shows a portion of the take-off device.
Figure 6:
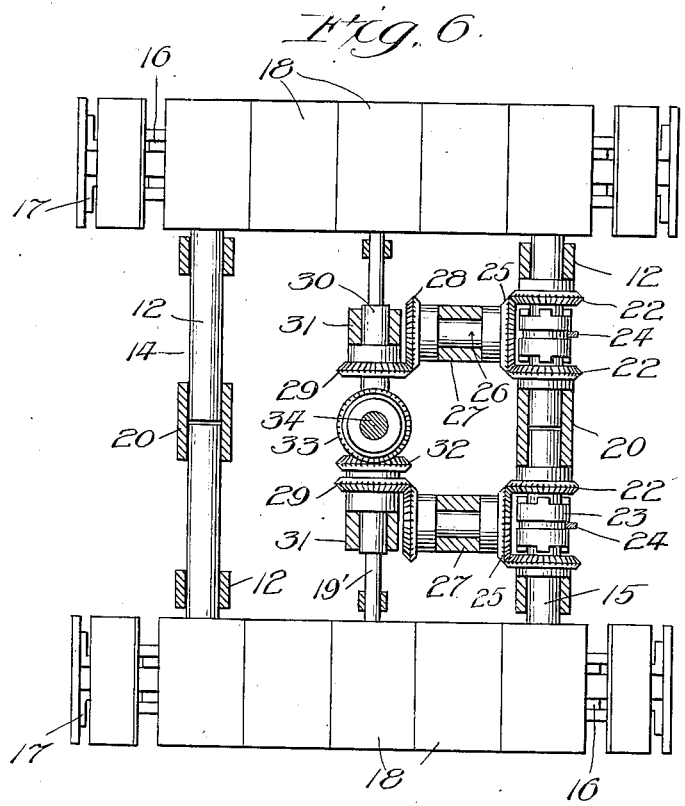
Figure 7:
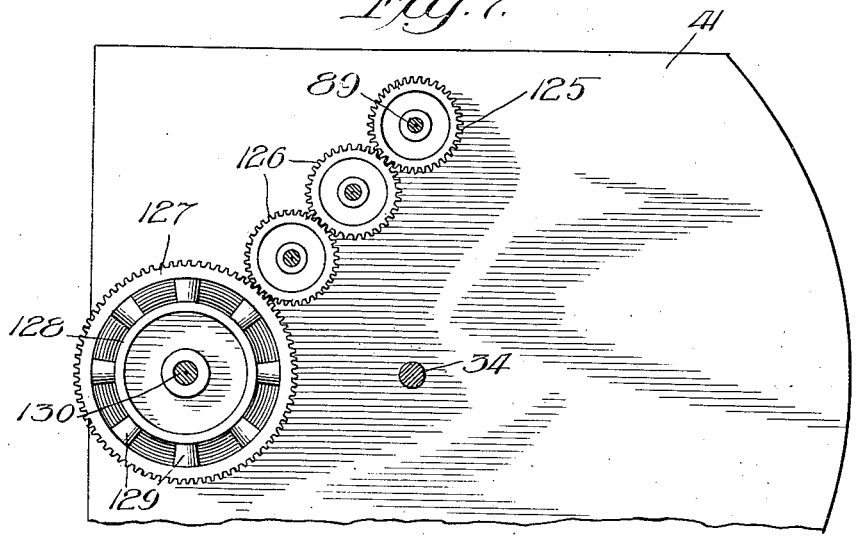
Figure 8:
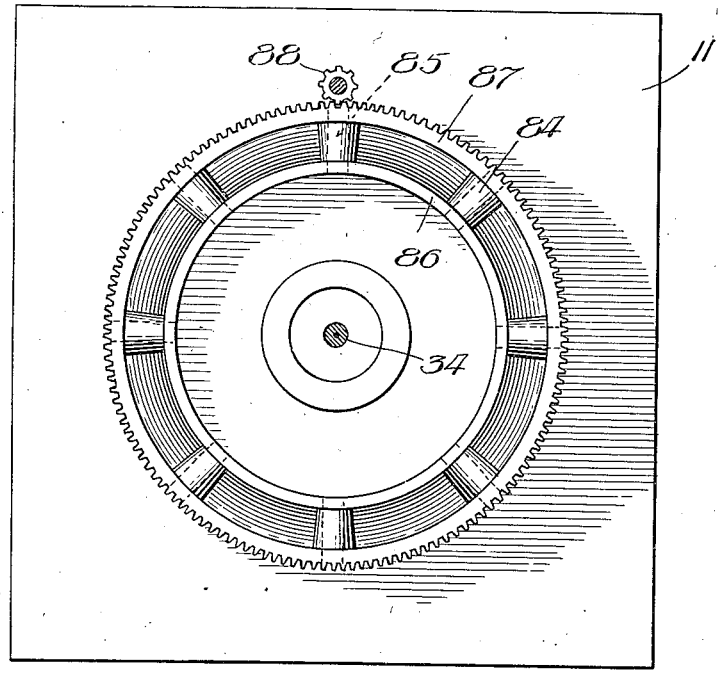

Figs. 6, 7 and 8 are horizontal sections on the lines 6—6, 7—7 and 8—8, respectively, of Fig. 5.

The truck or carriage of the machine is herein shown as made of suitably fabricated side channel members 10 and is surmounted by a platform 11, and secured at its lower side are bearing brackets 12 in which are rotatively mounted front and rear axles, designated as a whole by 14 and 15, respectively. Said carriage is shown as supported on and propelled by a caterpillar drive, comprising front and rear sprocket wheels or pulleys 16 fixed to the ends of the front and rear shafts 14 and 15 and about which are trained endless traveling belts or chains 17 that carry the usual tread blocks or bars 18 of a caterpillar drive. The lower laps of the caterpillar belts are supported by bearing pulleys 19 (Fig. 2) that are mounted on the outer ends of a horizontal shaft $19^1$ extending across the carriage (Fig. 5).

The rear and front shafts 14 and 15, respectively, are divided shafts, and central bearing brackets 20, depending from the platform 11, serve to support the proximate ends of the sections of the divided shafts. The front shaft is driven by means which permits both of the front caterpillar wheels to be simultaneously rotated in the same direction for driving straight ahead or backward; or simultaneously rotated in opposite directions for steering purposes, or one disconnected from the drive while the other is driven for the purpose of turning the machine. This result is effected in the present instance by providing each section of the front shaft 15 with opposing beveled pinions 22 (Fig. 6) which normally rotate freely thereon, and the pinions of each pair are adapted to be separately locked to the shaft to rotate therewith by a sliding clutch 23 which is shiftable from a neutral to two extreme positions by a shipping lever 24. The pinions of each pair are in constant mesh with driving pinions 25 fixed to the rear ends of the short, horizontal shafts 26 that are mounted in suitable brackets 27 depending from the carriage. Said shafts 26 carry at their rear ends beveled pinions 28 and each pinion 28 meshes with a pinion 29 fixed to a short, transverse shaft 30 that is rotatively mounted in brackets 31 which depend from the platform 11. Said shaft 30 also carries a third pinion 32, herein shown as made integral with one of the pinions 29, and said third pinion meshes with a driving pinion 33 fixed to the lower end of an upright shaft 34 that extends upwardly through the platform 11 centrally thereof. The upper end of said shaft 34 carries a beveled pinion 36 which meshes with a beveled pinion 37 that is fixed to a rotative shaft 38 arranged horizontally above the platform 11 (Figs. 2, 3 and 4) and is supported in suitable bearings 40 that rise from a turn-table 41 which is supported on the platform 11 in a manner to rotate about its central axis.

The shaft 38 is driven from a motor 43 (Figs. 2 and 3), carried by a turn-table, through the medium of a sprocket belt 44 and sprocket pulleys 45, 46 carried by said shaft 38 and the motor shaft, respectively. The pulley 45 rotates loosely on the shaft 38 and may be locked thereto by any suitable form of clutch 46' actuated by a shipping lever 46². Through the manipulation of the clutches 23, it will be evident that either one of the continuously driven beveled pinions 22 (Fig. 6) of each pair may be locked to its associated section of the divided front shaft so as to secure the driving, steering and turning effects above mentioned. A clutch 47 operated by a shipping lever 48 serves to connect and disconnect the pinion 37 to and from the shaft 38, and thereby wholly disconnect the front axle from driving power.

50 designates a boom which is supported upon upright standards 51, 51 that rise from and are fixedly supported on the turn table. Said boom may be provided with any suitable pick-up mechanism, an endless series of traveling buckets 52 being herein shown. The chains which carry said buckets are trained about upper and lower pulleys 54, 55, the upper pulley being driving pulleys. The pulleys 54 are mounted on a shaft 56 that carries at one end a sprocket wheel 57 which is connected by a sprocket belt 58 to a sprocket wheel 59 on the shaft 38, before referred to, whereby the series of buckets are driven. A clutch 59', serves to connect and disconnect the sprocket wheel 57 to and from the shaft 56, whereby power may be connected to and disconnected from the series of buckets.

The manner of mounting the boom on the standards 51 consists in extending a shaft 60 transversely through the boom between its ends, near the upper or discharge end thereof, as herein shown, and providing bearings in the upper ends of the standards 51 in which said shaft is mounted. Preferably braces 62 are attached to the sides of the boom and extend rearwardly therefrom and have bearing on said shaft in order to strengthen the connection between the boom and its support.

The forward, lower end of the boom is supported from the turn table through the medium of extension arms 65, 65 (Figs. 1 and 2) that are attached to and extend forwardly from the turn table and are raised at their free ends above the level of the turn table. Adjusting jackets 66 are interposed between the forward ends of said extensions and flanges 67 that are attached to and extend laterally from the sides of the boom. Said jacks consist of rods which are threaded at their lower end in bars 68 that lie on the extensions 65 and extend loosely through openings in said extensions; and the upper ends of said rods extend also loosely through other openings 69 in the flanges 67 (Fig. 1). Springs 70 are interposed between said flanges and apertured, central enlargements of the jacks, provided to receive an implement for turning the jacks, to raise or lower the boom. The construction described permits the lower or receiving end of the boom and the buckets carried thereby to be raised and lowered about the pivot shaft 60 to cause the buckets to approach more or less closely the surface on which the machine is supported, and also provides a yielding or resilient connection between the boom and the fixed parts of the machine, which absorbs shocks and jars due to violent contact of the buckets with the work.

As a further and separate improvement, the turn table is mounted on the carriage by means which permits the table to be turned about its central axis, said axis being in the present instance coincident with the axis of the shaft 34, so as to swing the boom from side to side and also to afford a slippage between the turn table and the driving means which rotates and supports it in the event the boom is swung against an obstruction of such nature as to throw an objectionable lateral strain on the boom and upon the turn table structure. The construction by which this result is effected is herein shown as made as follows, reference being had more particularly to Figs. 2, 4, 5 and 8.

Supported on and fixed to the upper face of the platform 11 is a casting 75 that is formed on its upper face, at its margin, with an annular, outwardly inclined bearing face 76. 77 designates an upper mating plate that is formed with a downwardly facing annular, inclined bearing face 78. Said plates are centrally interlocked so as to center one plate with respect to the other to permit the upper plate to rotate relatively to the lower plate. For this purpose the upper plate is shown as provided with a central depending hub 80 which is axially pierced for the passage of the upright shaft 34 and in which the shaft has bearing, and said hub is seated within a concentric, annular, upstanding flange 82 which rises from and is made integral with the lower bearing plate 75.

Interposed between the inclined bearing faces of the upper and lower plates is an annular series of tapered rollers 84 which are rotatively mounted on shafts 85, indicated in dotted lines in Fig. 8, and said shafts are seated at their ends in inner and outer concentric retaining rings 86, 87 that hold the rollers in operative positions relatively to each other.

The outer ring 87 is provided with a series of teeth or cogs which mesh with a pinion 88 that is fixed to the lower end of a shaft 89 (Fig. 4) that extends downwardly through the turn table and is rotatively mounted in a suitable bearing carried by said turn table. The upper end of the shaft carries an upwardy facing beveled gear 91 which is in constant mesh with opposing beveled gears 92, 92 carried by the shaft 38, before referred to. Said beveled gears 92, 92 are normally loose on the shaft and are adapted to be locked or clutched to the shaft by means of suitable clutch devices 94, 94 slidable on the shaft 38. Preferably they are connected together so that they may be operated from a single shipping lever 95 by means of a link 96. The clutches may be of any suitable type, but are herein shown as friction clutches.

When one of the beveled gears 92 is locked to the shaft by its associated clutch, the companion gear 92 is released from the shaft and the set of bearing rollers 84 is rotated through the shaft 89 and pinion 88 in one direction. Said parts are rotated in the opposite direction by reversing the position of the clutches 94. The associated clutch mechanisms are so connected that the central position of the shipping lever 95 is a neutral position with respect to the clutches so as to transmit no motion to the rollers and retaining rings.

By reason of the fact that the turn table is directly supported on the platform through the medium of said series of rollers, the weight of the said turn table and the boom and pick-up devices supported thereby will be sufficient to cause the turn table to turn or rotate with the series of rollers 84 and to thereby swing the boom from side to side when the boom is free from a resisting obstruction. If, however, the boom should strike an obstacle such as would bring an undue strain on the boom and the turn table, the presence of the rollers 84 will permit the series of rollers and their retaining rings to rotate relatively to the turn table, thereby providing a slippage which will relieve the objectionable strain. The said rollers also serve to support the turn table radially distant from its axial turning station in such manner as to relieve the central turn table bearings from side friction due to side canting, such as would occur if the turn table were supported solely by its central bearing.

The material is delivered from the series of buckets 52 upon the forward end by an endless take-off belt 100 which is supported on a frame 101 that is pivoted at its forward end to the turn table below the discharge end of the boom. In the present instance the take-off belt frame is pivoted to a short, horizontal shaft 102, which is supported in upright bearings or standards 103. Said bearings 103 rise from a smaller turn table 104 (Figs. 2, 3 and 5) that is supported on the turn table 41 in rear of the turning axis thereof. The take-off belt frame is provided at its forward end with a hopper 106 to receive the material from the discharge end of the boom and to guide it on to the belt. The belt is trained about rollers 107, 108 at the forward and rear ends of the frame 101, the rear roller 108 being a driving roller. The upper lap of the belt is preferably supported by laterally disposed pairs of conical rollers 110 mounted in suitable bearings carried by the side members of the take-off belt frame so as to give to the major length of the upper lap of the belt a trough-like formation to prevent the material from falling off the belt. The lower lap of the belt is supported between the ends of the frame on cylindrical supporting rollers 111.

The said frame is supported at different vertical angles from the boom supporting standards 51 through the medium of a bail 112 that is connected to the frame between the ends thereof, a second bail-like member 113 that is fixed to the upper ends of said standards 51 and a cable 114 that is trained about sheaves 115, 115 suitably connected to the said bails.

The take-off belt frame may be driven by an individual motor 118, supported at one side of the frame 101, through the medium of a shaft 119 that is rotatively mounted in bearing brackets 120 carried by the frame. The shaft is provided at one end with a beveled pinion 121 which meshes with a beveled pinion 122 fixed to the adjacent end of the shaft 123 which carries rear belt driving roller 108.

By reason of the relative eccentric location of the vertical turning axis of the take-off belt turn table to the turning axis of the turn table 41, the hopper of the take-off belt is caused to travel from side to side as the turn table is rotated to swing the boom from one side to the other. Thus the relative eccentric mounting of the two pivots causes the hopper to always assume a position to receive the material discharged from the buckets at the rear or discharge end of the boom.

Figure 4:
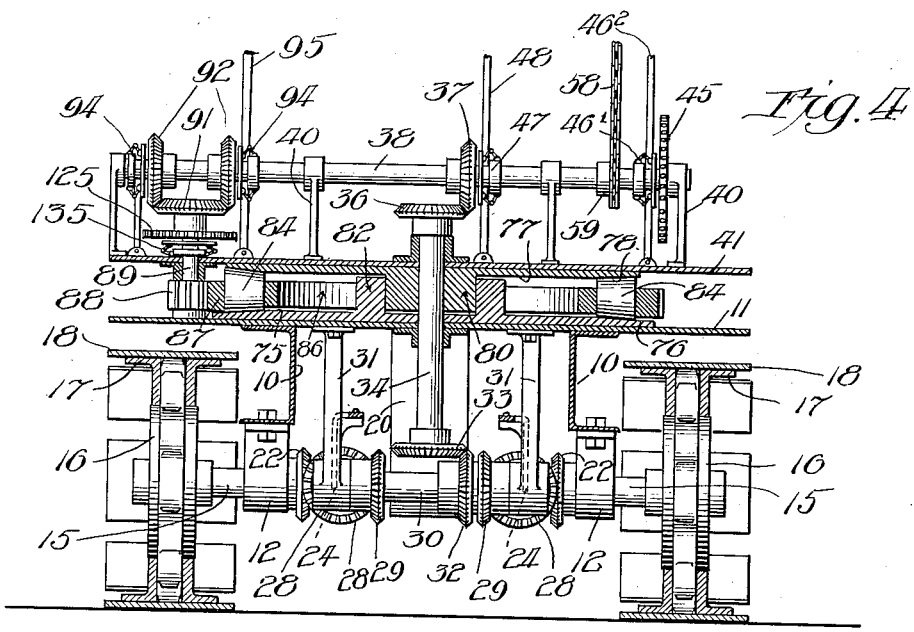
Fig. 4 is an enlarged vertical section on the line 4—4 of Fig. 2.

If desired the turn table 104 which supports the forward end of the take-off belt frame may be positively geared to the means which rotate the main turn table supporting rollers 84. This may be effected by providing the shaft 89, which transmits power to rotate said turn table supporting rollers, with a spur gear 125 (Figs. 4 and 7) that is connected, through a series of idle gears 126, with the gear teeth 127 of a roller retaining ring, between which and an inner retaining ring 128 are rotatively mounted conical rollers 129 which operate to support the turn table 104 from a bearing plate 132 supported in the turn table 41. In this construction the retaining rings may be fixed to the turn table 104. The said spur wheel 125 is normally loose on the shaft 89 and may be locked thereto, to operate the turn table 104, by means of a clutch 135 that is operated by a foot pedal 136 (Figs. 3 and 4). The said turn table 104 rotates about an axis represented by a shaft 130 (Fig. 7) which centers the turn table and annular series of rollers relative to the bearing plate 132. With the construction described, and with the gearing between the take-off belt turn table and the shaft 89 properly proportioned, the take-off belt frame will be so controlled that its rear end will always occupy a proper position relatively to a receiving receptacle or vehicle below the same, notwithstanding the swinging movement of the forward end of the said frame, due to the eccentric location of its turning axis to that of the boom supporting turn table 41.

I claim as my invention:—

1. A loading machine comprising a carriage, a turn-table supported thereon, the supporting means comprising an upper and a lower plate provided with tracks, with an annular series of rollers between the tracks, and with means to center said plates relatively to each other and the rollers, means to rotate said series of rollers comprising a motor driven shaft, with means to disconnect the motor from the shaft, a second shaft geared to said first shaft, with clutch means to disconnect the first from the second shaft and to drive the second shaft from the first shaft in both directions, gearing between said second shaft and the part which rotates with said series of rollers.

2. A loading machine comprising a carriage, a turn-table mounted to rotate thereon, a boom supported on and extending beyond the turn-table, with material pick-up means carried thereby, a take-off belt frame and belt, with the receiving end thereof in position to receive material from said pick-up means, a turn-table and support for said frame mounted to turn on a vertical axis carried by said boom turn-table eccentric to the turning axis of the latter, a horizontal pivot to connect the take-off belt frame to its turn-table, and means to turn the boom turn-table connected to and positively driving the take-off belt frame turn-table.

3. A loading machine comprising a carriage, a turn-table mounted to rotate thereon, a boom supported thereby and extending from the carriage, with traveling material pick-up means carried thereby, a take-off belt frame located with its receiving end beneath the rear end of the boom, vertical and horizontal pivots connecting said take-off belt frame to said boom turn-table, with the vertical pivot eccentric to the turning axis of the boom turn-table, and adjustable means to support the free end of the take-off belt frame in varying vertical positions of adjustment.

4. A loading machine comprising a carriage, standards rising therefrom, a boom, with traveling pick-up devices carried thereby, means for pivotally supporting the boom on the standard, a boom supporting arm extending forwardly from the carriage, and adjustable resilient means between said arm and boom for adjusting the boom about its pivot and for yieldingly resisting take-up stresses on said pick-up means.

5. A loading machine comprising a carriage, standards rising therefrom, a boom, with traveling pick-up devices carried thereby, means for pivotally supporting the boom on the standard between the ends of the boom, a boom supporting arm extending forwardly from the carriage, and means for supporting the boom from said arm comprising a flange on the boom, and rods threaded to members supported on said boom and having means to loosely connect them to said arm and said boom, with means interposed yieldingly between said rods and said boom to take-up loading stresses of the pick-up devices.

6. A loading machine comprising a carriage, standards rising therefrom, a boom, with traveling pick-up devices carried thereby, means for pivotally supporting the boom on the standard midway between the axis of the latter, a boom supporting arm extending forwardly from the carriage, means for supporting the boom from said arm comprising a flange on the boom, a shaft, a bar supported on said arm through which the shaft is threaded, the threaded end of the shaft extending loosely through said arm, and the other end of the shaft extending loosely through apertures in said flange, and a spring interposed between said flange and a shoulder on the shaft.

In witness whereof I claim the foregoing as my invention, I hereunto append my signature, in the presence of two witnesses, at Chicago, Illinois, this 26th day of September, 1917.

GEORGE W. JACKSON.

Witnesses:
 WILLIAM LITTALL,
 S. E. WALBRIDGE.